United States Patent [19]

Ishii

[11] Patent Number: 4,728,260
[45] Date of Patent: Mar. 1, 1988

[54] DIRECTION-SELECTABLE SENDING-OUT PUMP

[75] Inventor: Fumio Ishii, Ueda, Japan

[73] Assignee: Maruko Keihouki Kabushiki Kaisha, Chiisagata, Japan

[21] Appl. No.: 40,967

[22] Filed: Apr. 21, 1987

[30] Foreign Application Priority Data

Apr. 30, 1986 [JP] Japan .................................. 61-100247

[51] Int. Cl.$^4$ .............................................. F01D 1/30
[52] U.S. Cl. .................. 415/152 A; 137/119; 417/442
[58] Field of Search ............... 415/152 A, 148, 152 R; 137/119; 417/315, 442

[56] References Cited

U.S. PATENT DOCUMENTS

| | | | |
|---|---|---|---|
| 2,205,902 | 6/1940 | McMahan | 415/152 A |
| 2,864,312 | 12/1958 | Shelton et al. | 415/26 |
| 2,883,843 | 4/1959 | Bochan | 415/26 |
| 3,857,461 | 12/1974 | Schmitt | 417/315 |
| 3,886,288 | 9/1974 | Evans | 417/442 |
| 4,331,295 | 5/1982 | Warihashi | 415/152 R |
| 4,679,983 | 7/1987 | Pietryk et al. | 415/152 A |

Primary Examiner—Robert E. Garrett
Assistant Examiner—John T. Kwon
Attorney, Agent, or Firm—Jordan and Hamburg

[57] ABSTRACT

An impeller driven by a reversible motor is set in a housing and a functional path capable of sending out liquid by pump action is formed between the inner wall of the housing and the impeller. On the both-end side of the functional path are provided two adjacent valve chambers divided by a partition, and within this partition is provided a liuqid introducing path leading to the valve chambers via inlets. On the wall of the valve chamber facing the inlet is opened an outlet, and a valve body which opens and closes the inlets and outlets is set. The liquid introducing path, one valve chamber, the functional path, and the other valve chamber are arranged in series, so that, while one valve chamber is positive in pressure, the other chamber does not fail to be negative in pressure. Thus, liquid is sent out exactly to the outlet on the positive pressure side, without being erroneously set to the other outlet on the negative pressure side.

9 Claims, 15 Drawing Figures

DIRECTION-SELECTABLE SENDING-OUT PUMP

BACKGROUND OF THE INVENTION

This invention relates to a direction-selectable sending-out pump, in more detail to a direction-selectable sending-out pump capable of supplying liquid selectably to two routes from one tank, which may find use, for example, in supplying washer liquid selectably to the front and rear windows of a car.

In general, such a car as supplies washer liquid to its front and rear windows is provided with two sets of washer-liquid tanks and sending-out pumps, each being for each window. Such separate provision of washing devices, however, gives rise to disadvantages such as space occupation an cost rise.

To solve the above problems, a system has been devised in which one direction-selectable sending-out pump sends out washer liquid from one common washer-liquid tank selectably to two washing routes.

FIG. 14 shows an axial-direction sectional view of the above-mentioned conventional direction-selectable sending-out pump, and FIG. 15 shows a XV—XV sectional view for FIG. 14 (Patent laying open No. 60-6096).

In the pump 10 shown, a centrifugal impeller 14 is fixed on the output shaft of a reversible motor, and on the side of a housing 16 accommodating the impeller 14 there are manifold chambers 20 and 22 partitioned vertically by an elastic membrane 18. The upper and lower manifold chambers 20 and 22 are connected to the housing 16, respectively, by tangent-direction conduits 24 and 26 symmetrically positioned with respect to the housing 16. In the manifold chambers 20 and 22, outlet apertures 28 and 30 are opened at positions facing the elastic membrane 18 and the edges of these outlet apertures 28 and 30 are formed into valve seats.

With this structure, when the impeller 14 rotates counter-clockwise in FIG. 15, the liquid flowing through the axial-direction hole 32 into the housing 16 flows through both the tangent-direction conduits 24 and 26 into the manifold chambers 20 and 22, respectively. In this process, the pressure in the tangent-direction conduit 24 along the rotational direction of the impeller 14 becomes higher than that in the tangent-direction conduit 26 against the rotational direction of the impeller 14. The pressure difference thus raised will bring the elastic membrane 18 into tight contact with the valve seat so as to close the outlet aperture 30 and open the outlet aperture 28, with liquid being sent out through the outlet aperture 28.

On the other hand, when the impeller 14 is rotated clockwise, the outlet aperture 28 will be closed by the elastic membrane 18 and the outlet aperture 30 opened, with liquid being sent out through the outlet aperture 30.

In such a process, liquid is allowed to be sent out selectably into two flow paths.

However, the above-described direction-selectable sending-out pump 10 has problems as follows.

Both the tangent-direction conduits 24 and 26 are located on the outlet side with respect to the inlet side (the axial-direction hole 32) of the pump, though with different angles. Because on this positioning, rotation of the impeller 14 makes the pressures within both the tangent-direction conduits 24 and 26 higher than that in the inlet side irrespective of rotational directions, and on the other hand, rotation of the impeller 14 produces pressure difference between both the tangent-direction conduits 24 and 26 depending on the rotational direction of the impeller. The working mechanism for bringing the elastic membrane 18 into contact with the valve seat is based merely on utilization of this pressure difference.

Both the tangent-direction conduits 24 and 26 simultaneously become positive in pressure as described above. Therefore, if presence of contaminants, etc. has caused imperfect sealing of the valve seat normally to be sealed by the elastic membrane 18, a trouble is caused that liquid is sent out, though with low pressure, into the outlet side normally to be shut out. The same leak trouble occurs also at the rise period of pump, when the power supply voltage is lowered, when the flow-path resistance between pump and outlet nozzle, and so on, where the pressure difference is not large enough to bring the elastic membrane into perfect contact with the valve seat.

SUMMARY OF THE INVENTION

This invention was made to solve the above-described problems.

The object of this invention is to provide a direction-selectable sending-out pump capable of complete prevention of liquid leak into the outlet aperture side to be shut out.

The above object has been achieved by positioning a liquid introducing path, one valve chamber, a functional path effective for pumping action, and the other valve chamber in series irrespective of the rotational direction of the impeller. Concretely, at each of both ends of a functional path of approximate U shape there is provided each of two valve chambers divided by a partition from each other, a liquid introducing path is introduced into this partition, and inlets are provided to communicate the liquid introducing path with the valve chambers. An outlet is provided facing each of the inlets, and a valve body to open and close the inlets and outlets is provided.

The above-described series arrangement of the liquid introducing path, one valve chamber, the functional path is effective for pumping action, and the other valve chamber is effective for keeping the valve chamber on the liquid sending-out side positive in pressure and the other valve chamber on the liquid suction side negative in pressure. Therefore, even if presence of contaminants, etc. have caused incomplete sealing of the valve body, no liquid will be sent out erroneously into the outlet normally to be shut out, but liquid will be sent out to required positions with selectivity and exactness.

Both the outlets may preferably be equipped with check valves. With this embodiment, no liquid will return from the outlet into the valve chamber with negative pressure, liquid may be sent out to the required outlet instantly when the rotational direction of the impeller has been changed over, and the valve chamber is made more air-tight so as to make the pumping action more effective.

It makes the system more effective to provide an air vent communicating the housing with the liquid introducing path so that the air within the housing may escape to an external liquid tank through the liquid introducing path. This provision of air vent results in a favorable effect of increasing flow rate since no air will stay within the housing and because the air vent acts as a suction aperture on the lower pressure side.

It is convenient to compose the whole casing essentially of a pump proper and a cap. The pump proper has a parts accommodation section. The impeller and valve body are put in the parts accommodation section and the cap is applied on the parts accommodation section so as to be fixed on the pump proper. This structure facilitates the device assembly and reduces the number of parts effectively for cost reduction.

The direction-selectable sending-out pump of this invention adopts a simple pump structure of circumferential flow type which does not require so high accuracy on the valve body and is involved in little trouble. It is suitable particularly as the washer-liquid sending-out pump for washing car windows which is put into operation irregularly.

BRIEF DESCRIPTION OF THE DRAWINGS

FIG. 5 shows a front view of the pump proper;

FIG. 6 shows a sectional view along the VI—VI line in FIG. 5;

FIG. 7 shows a front view of the cap;

FIG. 8 shows a sectional view along the VIII—VIII line in FIG. 7;

FIG. 9 shows a front view of the valve body;

FIG. 10 shows a sectional view along the X—X line in FIG. 9;

FIG. 11 shows a plan view for the state where the impeller and valve body are accommodated in the pump proper; and FIG. 12 shows a sectional view for the state where the pump is attached to an external liquid pump;

DESCRIPTION OF THE PREFERRED EMBODIMENT

Examples of preferred embodiments of this invention will be described in detail by reference to the accompanying drawings.

Figure 1:
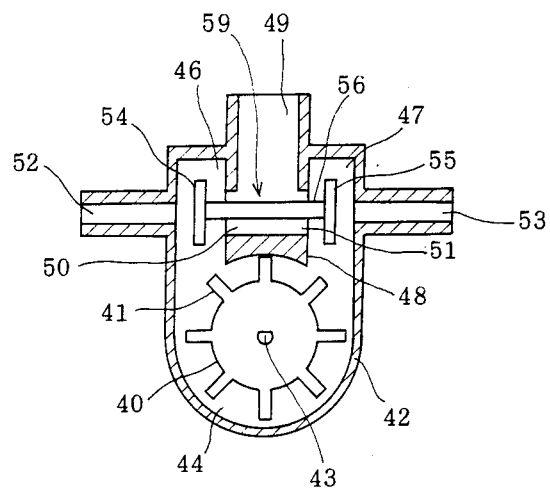
FIG. 1 shows a sectional view illustrating the principle of the pump according to this invention.
Figure 2:
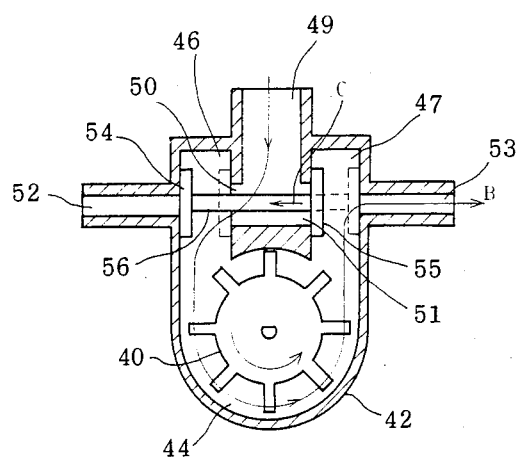
FIG. 2 shows a sectional view of the pump of FIG. 1 with its impeller rotating counterclockwise.
Figure 3:
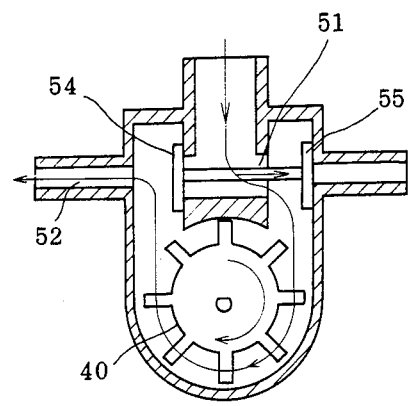
FIG. 3 shows a sectional view of the pump of FIG. 1 with its impeller rotating clockwise.

First, the fundamental principle of the device of this invention will be accounted for by referring to FIGS. 1-3.

In FIG. 1, a disk-shaped impeller 40 has a number of grooves 41 formed on its circumferential side and is set inside a housing 42 rotatable about a shaft 43. Rotation of the impeller 40 results in formation of a functional path 44 with a pumping action between the circumferential side of impeller 40 and the inside wall of housing 42.

The functional path 44 should preferably be designed to cover up to 80% of the circumferential side of the impeller (FIG. 1 shows a coverage of about 50%).

A valve chamber 46 connects to one end side of the functional path 44. The other valve chamber 47 connects to the other end side of the functional path 44.

Both the valve chambers 46 and 47 are located adjacent to each other with a partition inbetween. The partition has a liquid introducing path 49 formed inside, which connects to the valve chambers 46 and 47 via inlets 50 and 51, respectively. The liquid introducing path 49 connects to a liquid tank by a suitable connection pipe (not shown).

An outlet 52 is provided on the wall facing the inlet 50 of the valve chamber 46. The other outlet 53 is provided on the wall facing the inlet 51 of the valve chamber 47. Both the outlets 52 and 53 are smaller in aperture area than the liquid introducing path 49 and both the inlets 50 and 51.

A valve 54 serves to open and close the inlet 50 and outlet 52 of the valve chamber 46. The other valve 55 serves to open and close the inlet 51 and outlet 53 of the valve chamber. Both the valves 54 and 55 are fixed, respectively, on both the ends of a valve rod 56 which is supported slidably by a suitable material within the liquid introducing path 49 and both the inlets 50 and 51. The valves 54 and 55 and the valve rod 56 compose a valve body 59. The valve assembly is designed in such a way that, while a shift of the valve rod 56 allows one valve to close its associated inlet and open its associated outlet of the valve chamber, the other valve is allowed to open its associated inlet and close its associated outlet of the other valve chamber.

Next, the action of the above embodiment will be described.

While the impeller 40 is in static state, the valves 54 and 55 are in free state, without being fixed in position (FIG. 1).

A rotation of the impeller 40 in the direction indicated by the arrow A (FIG. 2) will make a negative pressure within the valve chamber 46 and a positive pressure within the valve chamber 47. Therefore, when the impeller 40 begins to rotate, the liquid is caused to flow from the inlet 50 into the valve chamber 46 in a negative pressure state, and on the other hand, within the valve chamber 47, the liquid is caused to flow to the back side (toward the outlet 53) of the valve 55. In consequence, both the sides of the valve 54 receive almost the same liquid pressures, and on the other hand, for both the sides of the valve 54, continuation of the rotation of the impeller 40 yields a negative pressure on the side of outlet 52 and a positive pressure on the side of inlet 50, and thus, both the valves 54 and 55 as a whole are put under the action of a pushing force in the arrow C direction. This action causes the valve 54 to open the inlet 50 completely with the outlet 52 closed, and at the same time, causes the valve 55 to close the inlet 51 with the outlet 53 completely opened (FIG. 2). In such sequence, the pumping action in the functional path 44 enables liquid to be sent to a required position via a piping, etc. not shown.

Note that the above operation is performed instantaneously. During this short period, a small quantity of liquid may flow from the outlet 52 into the valve chamber 46 whose pressure has been made negative, however, it is impossible that liquid is sent out into the side of the outlet 52 as in the conventional structure. Accordingly, even if the sealing of the outlet 52 by the valve 54 is not so complete, no liquid will be set out into the side of the outlet 52. On the other hand, even if the sealng of the inlet 51 by the valve 55 is complete, the liquid sent to the outlet 53 is reduced in quantity only slightly, without any significant trouble.

FIG. 3 shows a state where the impeller 40 is being rotated in a direction contrary to that in FIG. 2. In this case, similar actions operate to shift both the valves 54 and 55 in the reverse direction with resulting opening of the inlet 51 and outlet 52; the liquid is sent out through the outlet 52 to the other required position via a suitable piping, etc.

Figure 4:
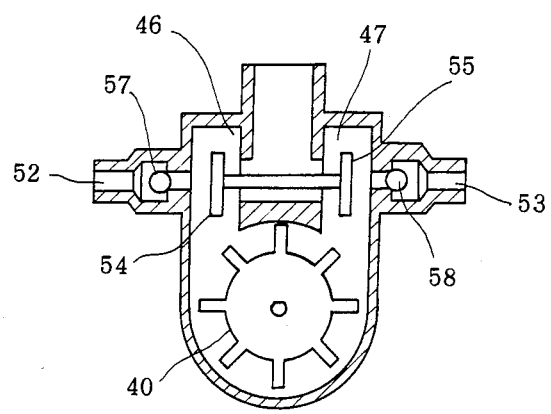
FIG. 4 shows a sectional view for an embodiment providing the outlet aperture with a check valve.

FIG. 4 shows another embodiment.

This embodiment is the same as the above-described one except that the outlets 52 and 53 are provided, respectively, with check valves 57 and 58 for preventing liquid from flowing back to the valve chambers 46 and 47, respectively.

This provision of the check valves 57 and 58 prevents the above-mentioned back flow of liquid from the outlet to the valve chamber at the start of rotation of the impeller 40. In turn, the prevention of back flow allows liquid to be sent out to the desired position instantly after the rotational direction of the impeller has been changed over. This is why any space existing within the pipe on the outlet-direction side as a result of back flow will retard the sending-out in proportion to the size of the space.

Note that the check valves shown are formed by inserting ball valves in the larger-diameter flow paths provided at the outlets 52 and 53; however, the structure of check valve is not restricted to this.

FIGS. 5-12 show another concrete embodiment. The same parts as in the above embodiment will be indicated by the same symbols.

This embodiment composes the casing as a whole essentially of a pump proper 61 and a cap 62 to facilitate device assembly. The pump proper 61 and the cap 62 are each formed of synthetic resin, etc. as a unit.

Figure 5:
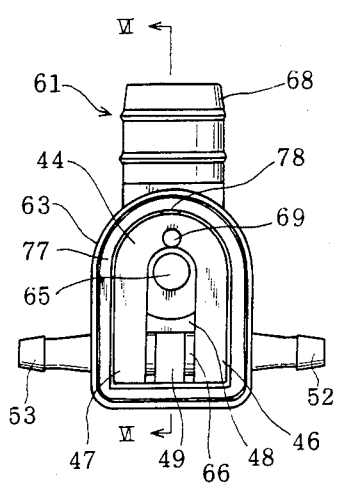
FIGS. 5-12 relate to another embodiment, where.
Figure 6:
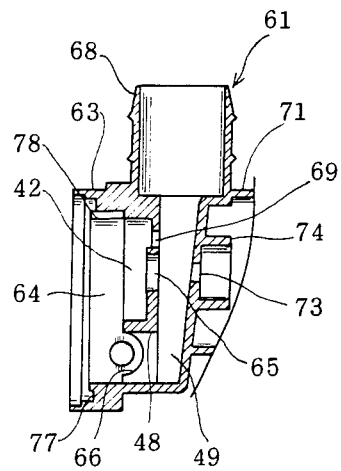
Figure 7:
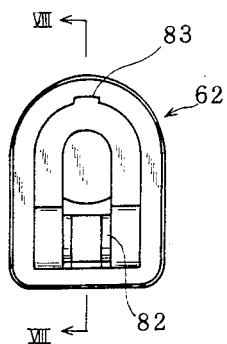
Figure 8:
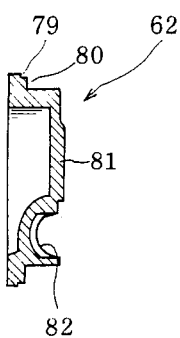
Figure 9:
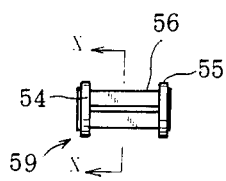
Figure 10:
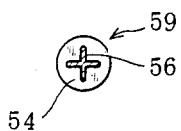

As seen from FIGS. 5 and 6, the pump proper 61 has a parts accommodation section 64 surrounded by a circumferential wall 63. The parts accommodation section 64 accommodates the impeller 40 and valve body 59 at device assembly.

On the inner bottom section of the parts accommodation section 64, there is provided a through-hole 65 to receive the boss of the impeller 40. The space closes to the inner wall of the parts accommodation section 64 serves as the functional path (the path giving rise to pumping action) of approximate U shape as shown in FIG. 5. Both ends of the functional path 44 form, respectively, the valve chambers 46 and 47 divided by a partition 48.

Figure 12:
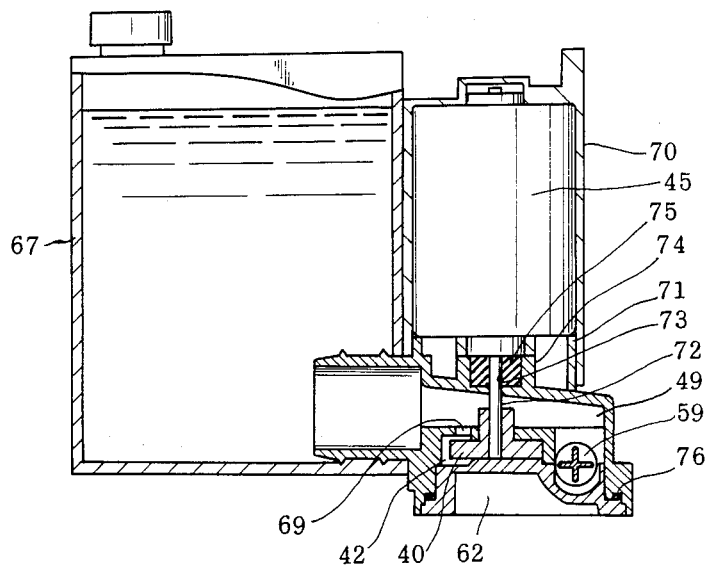
Figure 14:
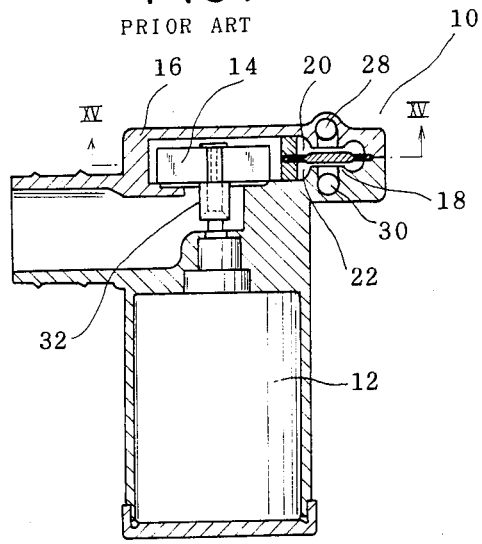
FIG. 14 shows a sectional view of a conventional pump.
Figure 15:
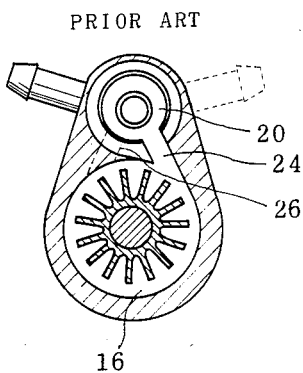
FIG. 15 shows a sectional view along the XV—XV line in FIG. 14.

The partition 48 rises from the inner bottom section of the parts accommodation section 64, and its wall toward the impeller forms an arc plane with which the impeller 40 comes in sliding contact. On the end plane of the partition 48 there is formed a groove 66 with a semicircular section, into the middle of which the liquid introducing path 49 is opened. The liquid introducing path 49 extends to the back plane side of the parts accommodation section 64 and its end section is opened as a connection aperture 68 to an external liquid tank 67 (FIG. 12). At the position on the parts accommodation section 64 where the impeller 40 is accommodated, i.e., the inner bottom plane of the housing 42, there is provided an air vent 69 connecting the housing 42 with the liquid introducing path 49.

The pump proper 61 is provided with a holding cylinder 71, which contacts a motor housing 70 for accommodating the reversible motor 45 (FIG. 12). An output shaft 72 of the reversible motor 45 enters the pump proper 61 through a throughhole 73 on the outer wall of the liquid introducing path 49 until its front end is received by the boss of the impeller 40.

A packing accommodation cylinder 74 holds a packing 75, sealing the through-hole and output shaft 72 liquid-tight.

The valve body 59 (FIGS. 9 and 10) as a whole is made of rubber-like elastic material, and the valve rod 56 is cross-shaped in section. In assembling the device, half of the valve rod 56 is inserted into the groove 66 on the partition 48.

The end plane of the above-mentioned circumferential wall 63 is provided with a groove 77 to hold a packing 76 (FIG. 12). On a part of the inner plane of the circumferential wall 63, there is formed a cut 78, which serves for positioning the cap 62 in the process of applying the cap 62 on the pump proper 61.

The cap 62 is put and fixed in the circumferential wall 63, with the parts accommodation section 64 covered as shown in FIG. 12.

The circumferential edge section of the inner plane of the cap 62 is provided with two stepped sections 79 and 80, which come in contact with the stepped section provided on the end plane of the circumferential wall of the pump proper 61.

On the inner plane of the cap 62, there is formed an expanded section 81, which forms one wall face of the housing 42 for accommodating the impeller 40 when the cap 62 has been combined with the pump proper 61. On the inner plane of the cap 62 corresponding to the above-mentioned partition 48 on the pump proper 61, there is formed a groove 82 with a semicircular section which corresponds to the groove 66 on the partition 48.

On the outer wall face of the expanded section 81, there is a projection 83 which goes into the cut 78 formed on the inner plane of the circumferential wall 63.

The device having the structure described above is assembled as follows. First, the motor housing 70 containing the reversible motor 45 is put and fixed in the pump proper 61. The fixation is effected either by using adhesive or by ultrasonic welding.

Figure 11:
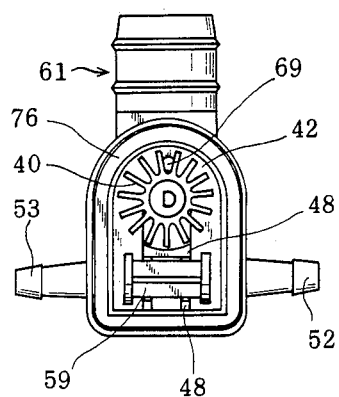

Next, the impeller 40 is fixed at the tip of the output shaft 72 of motor projecting in the parts accommodation section 64 of the pump proper 61. The valve rod 56 of the valve body 59 is placed in the groove 66 of the partition 48 (FIG. 11). The packing 76 is put in the groove 77 on the circumferential wall 63.

Then, the cap 62 is positioned so that the projection 83 goes into the cut 78 and combined with the pump proper 61, with the parts accommodation section 64 covered. The fixation of the cap 62 on the pump proper 61 may be effected either by using adhesive or by ultrasonic welding.

The fixation of the cap 62 on the pump proper 61 completes the construction of the housing 42 to accommodate the impeller 40. The valve rod 56 of the valve body 59 is now positioned movably in the hollow section formed by the combination of the groove 66 on the partition 48 with the groove 82 on the cap 62. The hollow section communicates the liquid introducing path 49 with the valve chambers 46 and 47.

The grooves provided on both the end plane of the partition 48 and the inner plane of the cap 62 may be replaced by one groove provided on either the partition side or the cap side; this suffices the formation of the hollow section allowing the valve rod to move in.

In this embodiment, the casing is composed essentially of the pump proper 61 and the cap 62, and the assembly is very easy since it is performed in the simple sequence: accommodation of the impeller 40 and valve body 59 in the parts accommodation section 64; and the application of the cap 62 on the pump proper 61, followed by fixation. Also, cost reduction may be achieved because of the small number of parts required.

Detailed description of this embodiment is omitted since the overall structure and principle are the same as those of the previous one.

Note that this embodiment has the air vent 69 communicating the housing 42 to the liquid introducing path 49. Therefore, as seen from FIG. 12, any air within the housing 42, under the action of the pushing force exerted by the liquid introduced into the housing and the buoyancy of air itself, is released via the air vent 60, the liquid introducing path 49 and the external liquid tank 67 to the atmosphere.

Figure 13:
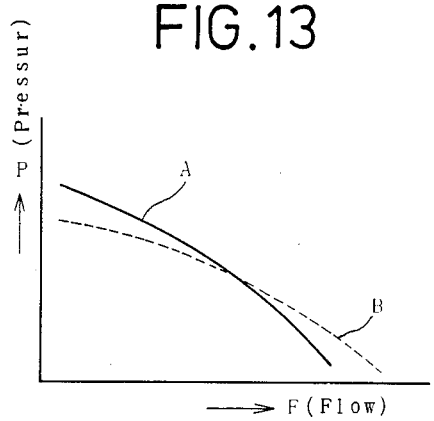
FIG. 13 shows a graph for the relation between pump pressure and liquid flow rate.

The provision of the pumping action path with the air vent 69 has a possibility of the pump function to be lowered. However, an experiment was conducted to give a result practically favorable for the use as a washer pump, which is shown in FIG. 13 as the relation between pump pressure and flow rate. The provision of the air vent 69, though causing the maximum pressure to decrease, results in increasing flow rate, since the air vent 69 acts as a suction aperture on the lower-pressure side.

The reversible motor 45 may, of course, be driven by any driving sources such as electricity and oil pressure, etc.

The present invention has been described in detail by reference to preferred embodiments. However, of course, it is not to be restricted to the embodiments described but a number of modifications may be made within the scope not deviating from the spirit of the invention.

What we claim is:

1. A direction-selectable sending-out pump comprising:
    a housing;
    an impeller, which is set rotatably within said housing, is provided on its circumferential wall with a number of blades, and forms a functional path, to send out liquid by pump action, between the inner wall of said housing and the outer circumference of said blades.
    a reversible motor, which rotates reversibly said impeller connected to its output shaft;
    two valve chambers adjacently connected with a partition, each of which is located at each of both end sides of said functional path in communication with the functional path;
    a liquid introducing path, which not only connects to an external liquid tank but also extends into said partition dividing said two valve chambers;
    inlets opened on said partition to communicate said liquid introducing path with both said valve chambers;
    outlets each provided, on the inner walls of both said valve chambers, facing each of said inlets; and
    a valve body, which is provided with a valve rod, inserted slidably in said partition and projectable into said valve chambers, and with valves, fixed each at both ends of said valve rod and capable of allowing a shift of said valve rod to result in opening said inlet and closing said outlet of one of both said valve chambers and simultaneously closing said inlet and opening said outlet of the other one of both said valve chambers.

2. A direction-selectable sending-out pump according to claim 1 wherein said functional path is made approximately U-shaped.

3. A direction-selectable sending-out pump according to claim 1 wherein said valve body is inserted transferably in a part of said liquid introducing path and the flow paths formed by both said inlets.

4. A direction-selectable sending-out pump according to claim 3 wherein said rod of valve body is made cross-shaped in section.

5. A direction-selectable sending-out pump according to claim 1 wherein said valve body is made of rubber-like elastic material.

6. A direction-selectable sending-out pump according to claim 1 wherein each of both said outlets is provided with a check valve to prevent back flow of liquid into the respective valve chamber.

7. A direction-selectable sending-out pump according to claim 6 wherein said check valve is a ball valve inserted in a larger-diameter flow path provided at said outlet.

8. A direction-selectable sending-out pump according to claim 1 wherein an air vent connecting to said liquid introducing path is bored on the wall of said housing so as to release air enclosed in said housing of said external liquid tank.

9. A direction-selectable sending-out pump according to claim 8 wherein each of said pump proper and cap is made of synthetic resin as a unit.

* * * * *